US010270928B2

United States Patent
Sagata (10) Patent No.: US 10,270,928 B2
(45) Date of Patent: Apr. 23, 2019

(54) IMAGE FORMING APPARATUS, PRINTING METHOD WITH IMAGE FORMING APPARATUS AND PRINT PROCESS APPARATUS WITH PRINT CONDITION SETTINGS SET BEFORE PRINT DATA IS DOWNLOADED FROM A NETWORK LOCATION

(71) Applicant: Oki Data Corporation, Tokyo (JP)

(72) Inventor: Osamu Sagata, Tokyo (JP)

(73) Assignee: Oki Data Corporation, Tokyo (JP)

( * ) Notice: Subject to any disclaimer, the term of this patent is extended or adjusted under 35 U.S.C. 154(b) by 24 days.

(21) Appl. No.: 15/710,287

(22) Filed: Sep. 20, 2017

(65) Prior Publication Data

US 2018/0097950 A1    Apr. 5, 2018

(30) Foreign Application Priority Data

Sep. 30, 2016  (JP) ................. 2016-192444

(51) Int. Cl.
*H04N 1/32* (2006.01)
*H04N 1/00* (2006.01)
*G06F 3/12* (2006.01)

(52) U.S. Cl.
CPC ......... *H04N 1/00506* (2013.01); *H04N 1/001* (2013.01); *H04N 1/00244* (2013.01); *H04N 1/32122* (2013.01); *G06F 3/1253* (2013.01); *G06F 3/1268* (2013.01); *G06F 3/1271* (2013.01); *G06F 3/1278* (2013.01); *H04N 1/32106* (2013.01); *H04N 1/32128* (2013.01); *H04N 2201/3212* (2013.01); *H04N 2201/3249* (2013.01); *H04N 2201/3273* (2013.01)

(58) Field of Classification Search
CPC combination set(s) only.
See application file for complete search history.

(56) References Cited

U.S. PATENT DOCUMENTS

| 6,707,574 | B1 * | 3/2004 | Freeman | G06F 3/1204 |
| | | | | 358/1.3 |
| 9,164,708 | B2 * | 10/2015 | Muroi | G06F 3/1211 |
| 9,569,155 | B2 * | 2/2017 | Miyazawa | G06F 3/1253 |
| 9,639,304 | B2 * | 5/2017 | Oguro | G06F 3/1243 |

FOREIGN PATENT DOCUMENTS

JP    2005-159449 A    6/2005

* cited by examiner

*Primary Examiner* — Barbara D Reinier
(74) *Attorney, Agent, or Firm* — Muncy, Geissler, Olds & Lowe, P.C.

(57) ABSTRACT

An image forming apparatus downloads a content via a network and prints an image of the content.
when a shift instruction to shift to a first display process is input from a user operation unit after a registration process is completed, a control unit repeats the first display process, a second display process and the registration process so that another content information is newly created and stored in a first storage unit, and
when a print instruction to start printing is input from the user operation unit after the registration process is completed, the control unit downloads contents indicated with the content information stored in the first storage unit wherein these contents are defined as print target contents, and sequentially executes print operations for the images of one or more of the print target contents with the print conditions associated with the print target contents.

14 Claims, 8 Drawing Sheets

| URL | Color Mode | Tray | Double Side Print |
|---|---|---|---|
| http://hoge/sample1.pdf | 1 | 1 | 0 |
| http://hoge/sample2.pdf | 0 | 1 | 1 |
| ⋮ | ⋮ | ⋮ | ⋮ |
| http://hoge/sample9.pdf | 0 | 1 | 1 |

| |
|---|
| pdf |
| jpg |
| ⋮ |

IMAGE FORMING APPARATUS, PRINTING METHOD WITH IMAGE FORMING APPARATUS AND PRINT PROCESS APPARATUS WITH PRINT CONDITION SETTINGS SET BEFORE PRINT DATA IS DOWNLOADED FROM A NETWORK LOCATION

TECHNICAL FIELD

The present invention relates to an image forming apparatus and a printing method in the image forming apparatus for printing an image of a content downloaded via a network, and a print processing apparatus and print processing program for causing a print unit to print an image of a content downloaded via a network.

BACKGROUND

Generally, a general-purpose Web browser installed in a computer has a function of displaying digital content (hereinafter referred to as "content"), which is digital data downloaded from a server apparatus via a network, on a display unit, a function of accepting a user operation by a Graphical User Interface (GUI) displayed on the display unit or the like. When the user confirms the content displayed on the display unit and operates the print instruction of the content, the print device prints the image of the content displayed on the display unit.

On the other hand, built-in browsers, which are dedicated Web browsers built in image forming apparatuses such as printing apparatuses and multifunction peripherals (MFPs: Multi Function Peripheral), might be limited in their functions as compared with general-purpose Web browsers (For example, refer to Patent Document 1). For example, the built-in browser of the image forming apparatus displays a hyperlink as link destination information related to the content on the operation panel which is a touch panel having a display function and an input function, instead of displaying the content. When instructing the printing of the content with the built-in browser, the user selects a hyperlink indicating the content to be printed among one or more hyperlinks displayed on the operation panel (for example, a hyperlink is touched), thereby completing to instruct the printing of the content. In this way, the printing method of starting printing by selecting one of the one or more hyperlinks displayed by the built-in browser is also called browser direct printing.

Browser direct printing in a conventional image forming apparatus is performed in the following procedure. First, the image forming apparatus performs a "display process" in which one or more hyperlinks are displayed on the operation panel, and then the user performs a "selecting operation" in which one of more than hyperlinks are selected. Next, the image forming apparatus performs a "download process" in which the content of the link destination indicated by the selected one hyperlink is downloaded, and then the image forming apparatus performs a "print process" in which an image of the downloaded content is printed.

RELATED ART

Patent Document(s)

[Patent Doc. 1] JP Laid-Open Patent Publication 2005-159449

SUBJECT TO BE SOLVED

However, in the case of printing a plurality of contents by the conventional browser direct printing procedure, "display process", "selection operation", "download process", and "printing process" are required to repeat at the same number of times as the number of contents of print targets. In other words, after performing the "selection operation" of the content of print target, the user needs to wait for the completion of the "download process" and the "print process", and after this completion, the user needs to perform the "select operation" of the next content of print target. As described above, in the conventional browser direct printing, there is a long waiting time (that is, the time of "download process" and the time of "printing process") between the "selection operation" and the next "selection operation" by the user. Therefore, there is a drawback that the work efficiency is not excellent and the burden on the user is not low.

It is an object of the present invention to provide an image forming apparatus capable of efficiently printing a plurality of contents indicated by a plurality of link destination information and a printing method in the image forming apparatus. Another object of the present invention is to provide a print process apparatus capable of efficiently printing a plurality of contents indicated by a plurality of pieces of link destination information on a print unit.

SUMMARY

An image forming apparatus, disclosed in the application, that downloads a content via a network and prints an image of the content, comprising: a transceiver unit that connects to the network, a print unit that prints the image of the content, a display unit that displays information, a user operation unit that receives a user input made by a user, a first storage unit, and a control unit that controls operations of the image forming apparatus. Wherein the control unit executes a first display process, a second display process and a registration process, in the first display process, one or more link destination information, which is received through the transceiver unit, is displayed on the display unit wherein the link destination information is an address in the network by which the control unit is able to locate where an intended information exist in the network and to obtain the intended information, in the second display process that is executed when one of the link destination information is selected with the user operation unit, a setting screen of a print condition of content that is associated with the selected link destination information is displayed on the display unit, and in the registration process, content information in which the selected link destination information, the print condition that is set on the setting screen, and the content are associated each other is stored in the first storage unit, when a shift instruction to shift to the first display process is input from the user operation unit after the registration process is completed, the control unit repeats the first display process, the second display process and the registration process so that another content information is newly created and stored in the first storage unit, and when a print instruction to start printing is input from the user operation unit after the registration process is completed, the control unit downloads contents indicated with the content information stored in the first storage unit wherein these contents are defined as print target contents, and sequentially executes print operations for the images of one or more of the print target contents with the print conditions associated with the print target contents.

A print method, disclosed in the application, by an image forming apparatus provided with a transceiver unit that connects to a network, a print unit that prints an image of content, a display unit that displays information, a user operation unit that receives a user input made by a user, a first storage unit that storages information, and the apparatus downloading the content via the network and printing the image of the content, the print method, comprising: executing a first display process, a second display process and a registration process, in the first display process, one or more link destination information, which is received through the transceiver unit, is displayed on the display unit wherein the link destination information is an address information in the network by which the control unit is able to locate where an intended information exist in the network and to obtain the intended information, in the second display process that is executed when one of the link destination information is selected with the user operation unit, a setting screen of a print condition of content that is associated with the selected link destination information is displayed on the display unit, and in the registration process, content information in which the selected link destination information and the print condition, which is set on the setting screen, and the content are associated each other is stored in the first storage unit, and executing a repeating process and a download and print process. Wherein when a shift instruction to shift to the first display process is input from the user operation unit after the registration process is completed, the repeating process is executed, and in the repeating process, the first display process, the second display process and the registration process are repeated so that another content information is newly created and stored in the first storage unit, and when a print instruction to start printing is input from the user operation unit after the registration process is completed, the download and print process is executed, and in the download and print process, contents indicated with the content information stored in the first storage unit are downloaded wherein these contents are defined as print target contents, and print operations for the images of one or more of the print target contents with the print conditions associated with the print target contents are executed.

A print process apparatus, disclosed in the application, that downloads a content via a network and prints an image of the content, comprising: a transceiver unit that connects to the network, a display unit that displays information, a user operation unit that receives a user input made by a user, a first storage unit, and a control unit that controls operations of the image forming apparatus. Wherein the control unit executes a first display process, a second display process and a registration process, in the first display process, one or more link destination information, which is received through the transceiver unit, is displayed on the display unit wherein the link destination information is an address information in the network by which the control unit is able to locate where an intended information exist in the network and to obtain the intended information, in the second display process that is executed when one of the link destination information is selected with the user operation unit, a setting screen of a print condition of content that is associated with the selected link destination information is displayed on the display unit, and in the registration process, content information in which the selected link destination information and the print condition, which is set on the setting screen, and the content are associated each other is stored in the first storage unit, when a shift instruction to shift to the first display process is input from the user operation unit after the registration process is completed, the control unit repeats the first display process, the second display process and the registration process so that another content information is newly created, and when a print instruction to start printing is input from the user operation unit after the registration process is completed, the control unit downloads contents indicated with the content information stored in the first storage unit wherein these contents are defined as print target contents, and sequentially executes print operations for the images of one or more of the print target contents with the print conditions associated with the print target contents.

According to the present invention, since it is possible to efficiently print a plurality of contents indicated by a plurality of pieces of link destination information, the burden on the user can be reduced.

DETAILED DESCRIPTIONS OF PREFERRED EMBODIMENTS

<<1>>Configuration

Figure 1:
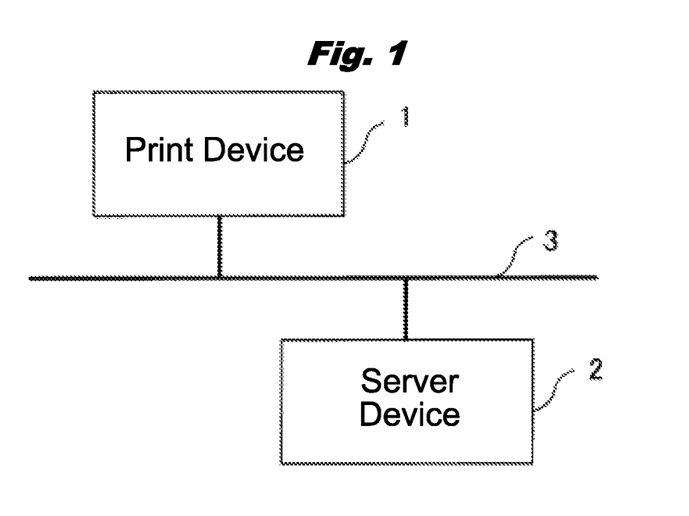
FIG. 1 is a diagram showing a printing apparatus and a server apparatus as an image forming apparatus according to an embodiment of the present invention.

FIG. 1 is a diagram showing a print device 1 as an image forming apparatuses and a server apparatus 2. As shown in FIG. 1, the print device 1 and the server apparatus 2 are communicably connected via a network 3. The network 3 is, for example, a communication network such as the Internet or LAN (local area network). The network 3 may be any type of network as long as it allows the print device 1 and the server apparatus 2 to communicate each other. Further, the print device 1 may be communicably connected to a plurality of server apparatuses via a network. The following description is an example, and the present invention is not limited to the following configuration.

The print device 1 is an image forming apparatus having a printing function, specifically, a color printer, a monochrome printer, a copying machine, a facsimile machine, a multifunction machine, or the like. The printing method adopted by the print device 1 is, for example, an electrophotographic method, but the printing method is not limited to a specific method. The print device 1 incorporates a built-in browser as a software program. The server device 2 is a computer such as a server computer or a workstation. The server apparatus 2 incorporates a Web server as a software program, and provides contents to the print device 1 via the network 3.

Figure 2:
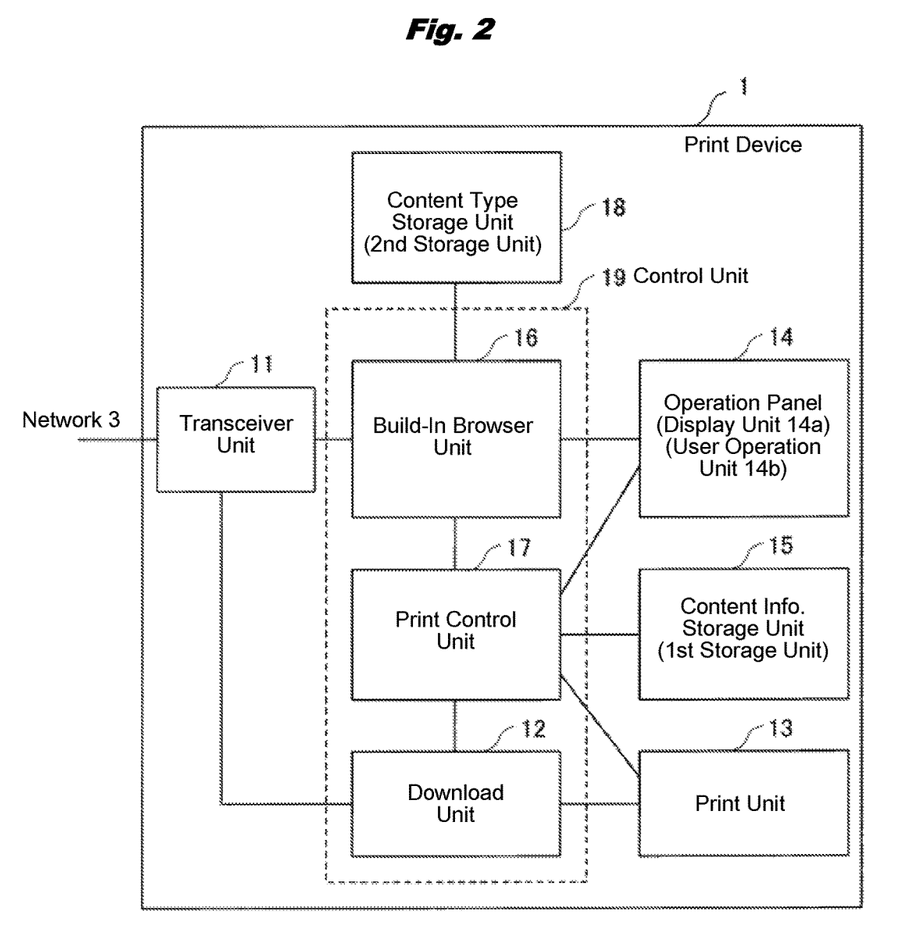
FIG. 2 is a functional block diagram showing a configuration example of a printing apparatus according to the present embodiment.

FIG. 2 is a functional block diagram showing a configuration example of the print device 1 according to the present embodiment. The print device 1 is a device capable of executing the printing method according to the present embodiment. As shown in FIG. 2, the print device 1 according to the present embodiment has the following configuration:

- a transceiver unit 11 connected to the network 3
- a print unit 13 for printing an image on a recording medium such as paper and sheet
- an operation panel 14
- a content information storage unit 15 as a first storage unit for storing information
- a control unit 19 for communicating via the transceiver unit 11 and for controlling operations of the entire devices.

The print device 1 may include a storage unit 18. The storage unit 18 has a function as a second storage unit, and stores content type that represent types of contents, which are printable by the print device 1.

The transceiver unit 11 is a network interface connected to the network 3. By the function of the transceiver unit, the user can communicate with the server device 2 via the network 3.

The operation panel 14 is a touch panel having a display unit 14a for displaying information and a user operation unit 14b for accepting user input. The display unit 14a and the user operation unit 14b may be separate and independent structures.

The control unit 19 has the following configuration, for example:

- a download unit 12 for downloading contents as digital data via the transceiver unit 11
- built-in browser unit 16
- a print control unit 17 for controlling the operations of the download unit 12 and the print unit 13 based on instructions from the built-in browser unit 16

The download unit 12 incorporates a downloader which is a software program. The built-in browser 16 incorporates a built-in browser which is a software program. The print control unit 17 incorporates a print control program. In other words, the three units (the download unit 12, the built-in browser 16, and the print control unit 17) constituting the control unit 19 are functional blocks that realize desired functions by executing software programs.

Figure 3:
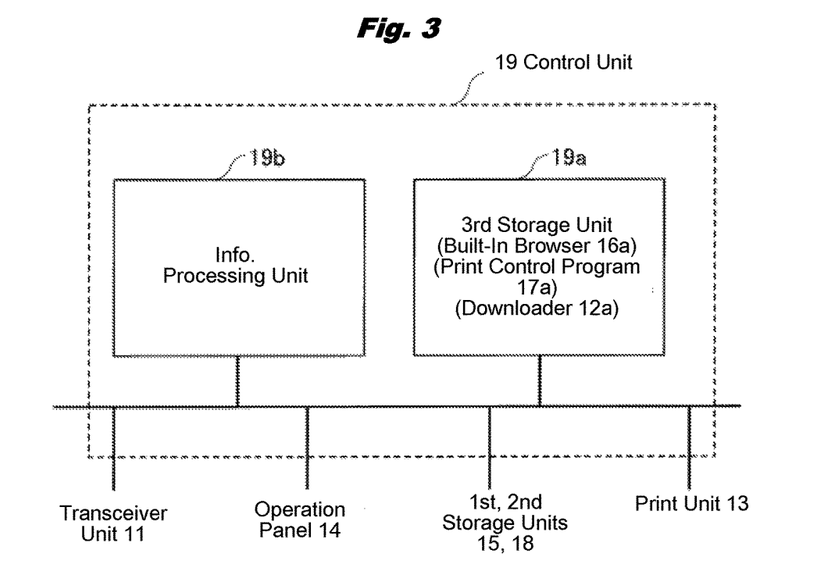
FIG. 3 is a block diagram showing an example of a hardware configuration of the control unit in FIG. 2.

FIG. 3 is a block diagram showing an example of a hardware configuration of the control unit 19 shown in FIG. 2. The control unit 19 has a third storage unit 19a such as a hard disk or ROM (Read Only Memory) and an information processing unit 19b such as a CPU (Central Processing Unit). The third storage unit 19a stores the downloader 12a, the built-in browser 16a, and the print control program 17a. The downloader 12a is a software program for realizing the function of the download unit 12. The built-in browser 16a is a software program for realizing the function of the built-in browser unit 16. The print control program 17a is a software program for realizing the function of the print control unit 17. The information processing unit 19b functions as the download unit 12 by reading and executing the downloader 12a from the third storage unit 19a. The information processing unit 19b functions as the built-in browser unit 16 by reading and executing the built-in browser 16a from the third storage unit 19a. The information processing unit 19b functions as the print control unit 17 by reading out and executing the print control program 17a from the third storage unit 19a. Note that the programs incorporated in the control unit 19 are not necessarily limited to three programs composed with the downloader 12a, the built-in browser 16a, and the print control program 17a. For example, the program incorporated in the control unit 19 may be a single program integrating the downloader 12a, the built-in browser 16a, and the print control program 17a. In addition, the built-in browser 16a does not directly display the contents on the display unit 14a, but has a function of displaying hyperlinks that are included in the contents.

The built-in browser unit 16 causes the operation panel 14 to display contents based on HyperText Markup Language (HTM) data, which are received from the server device 2 via the network 3. The built-in browser unit 16 performs a screen transition based on a user operation on the operation panel 14, requests content acquisition to the server device 2 based on a user operation on the operation panel 14, and does other operations. In addition, the built-in browser unit 16 determines whether or not a content type of the content (or content data file) of the hyperlink that is instructed by the user to refer is the same type as a content stored in the content type storage unit 18. It is noted that the control unit 19 is not limited to the configuration shown in FIG. 2 and FIG. 3 as long as the control unit 19 is configured to allow the print unit 13 to execute browser direct printings. Here, the browser direct printings are one type of printing where printing operations are initiated without displaying the contents to be printed on the operation panel 14.

Figure 8:
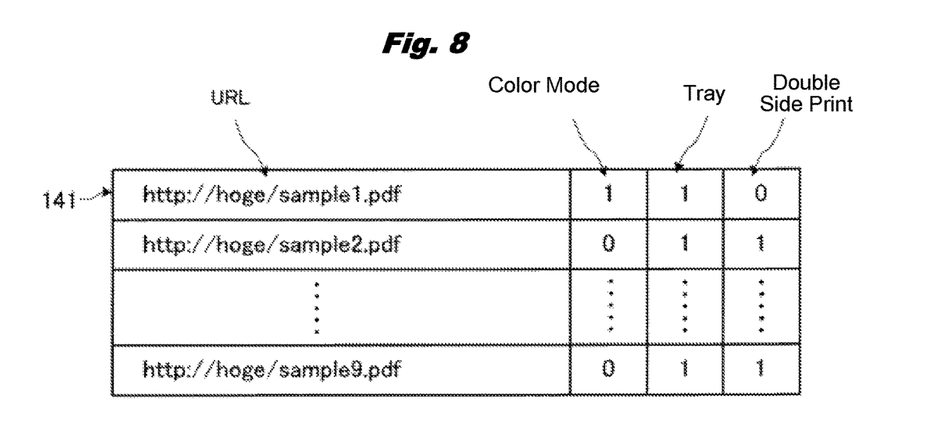
FIG. 8 is a diagram showing an example of content information stored in a content information storage unit of the printing apparatus according to the present embodiment.

The built-in browser 16 performs "first display process" (see FIG. 5 to be described later) for displaying one or more hyperlinks received via the transceiver unit 11 on the display unit 14a of the operation panel 14. These hyperlinks are pieces of link destination information to destine locations of intended files. Moreover, the built-in browser unit 16 can perform the "second display process" below. When one or more of the hyperlinks displayed on the display unit 14a of the operation panel 14 are selected by the user operation unit 14b of the operation panel 14, the built-in browser unit 16 operates to display a setting screen of print conditions of the content on the display unit 14a of the operation panel 14. The setting screen is shown in FIG. 6 which will be described later. The print conditions of this content are indicated by the hyperlinks selected from one or more hyperlinks as the received link destination information. Furthermore, the built-in browser unit 16 performs a "registration process" for storing the content information in the content information storage unit 15. The content information is information in which the selected link destination information and the print conditions set on the setting screen are associated with each other. The content information is shown in FIG. 8.

After the print condition is set and the "registration process" is performed, further when an instruction to shift to the "first display process" (i.e., an instruction of print standby) is input from the user operation unit 14b, the built-in browser unit 16 performs the "first display process" (FIG. 7 described later), the "second display process", and the "registration process" again. The instruction to shift is named as "shift instruction." Further, when a print start instruction is input from the user operation unit 14b after the print condition is set and the "registration process" is performed, the print control unit 17, which has received the instruction to start the printing from the built-in browser unit 16, causes the download unit 12 to download the content, which is a target to be printed, indicated by the link destination information of the content information stored in the content information storage unit 15. Next, the print control unit 17 performs the "print process" to print an image of the content downloaded using the print unit 13 under the print condition associated with the link destination information. This "printing process" is sequentially performed on one or more pieces of content information stored in the content information storage unit 15.

Figure 4:
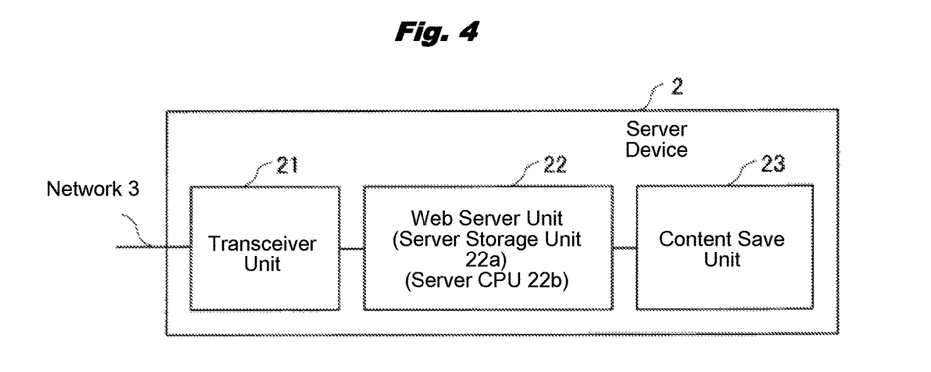
FIG. 4 is a functional block diagram showing a configuration example of the server device.

FIG. 4 is a block diagram showing a configuration example of the server device 2 shown in FIG. 1. As shown in FIG. 4, the server device 2 includes a transceiver unit 21 connected to the network 3, a web server unit 22 connected to the network 3 via the transceiver unit 21, a content save unit 23 as a storage device for storing contents that are supplied to the print device 1.

The transceiver unit 21 is a network interface, and enables a communication with the print device 1 via the network 3. The web server unit 22 includes a server storage unit 22a that is such as a hard disk or ROM storing a web server as a software program and an information processing unit that is such as a CPU that executes a web server that is a software program stored in the server storage unit 22a. The content save unit 23 is a storage device that is such as a hard disk or a Random Access Memory (RAM), and contents are stored as digital data provided to the printing device 1. Based on a request from the print device 1, the web server unit 22 provides the contents stored in the content save unit 23 to the print device 1 through the network 3.

Figure 5:
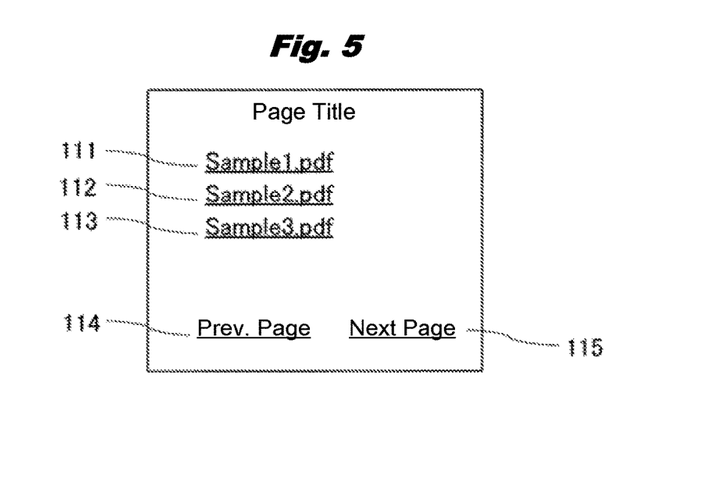
FIG. 5 is a diagram showing an example of a link destination information (hyper link) screen displayed on the operation panel by a built-in browser unit of the printing apparatus according to the present embodiment.
Figure 6:
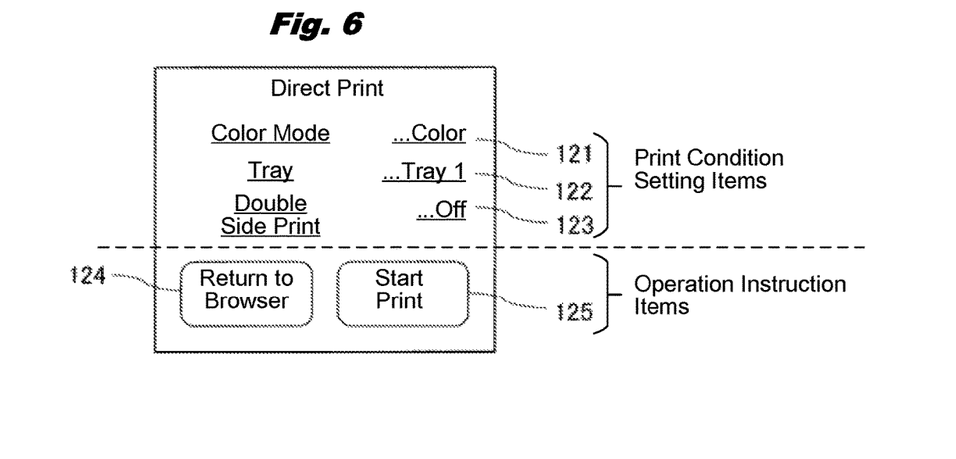
FIG. 6 is a diagram showing an example of a setting screen of print conditions displayed on the operation panel by the built-in browser unit of the printing apparatus according to the present embodiment.

FIG. 5 is a diagram showing an example of the link destination information (hyperlink) screen. Specifically, it is a screen displayed on the operation panel 14 by the built-in browser 16 of the print device 1 according to the present embodiment. In FIG. 5, "Sample1.pdf" 111, "Sample2.pdf" 112, and "Sample3.pdf" 113 are examples of hyperlinks as link destination information to Portabe Document Format (PDF) files. In FIG. 5, "previous page" 114 and "next page" 115 are examples of hyperlinks to the HTM files. When the type of printable content stored in the content type storage unit 18 is a PDF file, one of the hyperlinks (reference numerals 111 to 113), which is displayed on the screen in FIG. 5, is selected by the user touching the screen (or moving a cursor then clicking), etc., the built-in browser 16 instructs a printing of the PDF file destined by the hyperlink.

FIG. 6 is a diagram showing an example of a setting screen of print conditions that the print control unit 17 of the print device 1 displays on the operation panel 14 by according to the present embodiment. Upon receiving the print instruction from the built-in browser unit 16, the print control unit 17 displays the following contents on the operation panel 14 in order to assist the user to select:

Print settings that are settings of print conditions 121 to 123

"Start printing" 125 or "Return to browser" (that is, "print waiting" to return to the first display process).

In this embodiment, the following items are used for the print setting:
an item for selecting one of the color printing or monochrome printing as "Color Mode" (color or monochrome) 121
an item for selecting a paper feed tray "Tray" (tray 1, tray 2, multipurpose tray (MPT)) 122,
an item for print mode for selecting OFF or ON of "two-sided printing" 123.

Further, as operation instruction items, a button "Back to Browser" 124 for returning to the browser and a button "Print Start" 125 for instructing the start of printing are provided. By selecting one of the following two buttons, the user selects whether to return to the browser screen (that is, return to the first display process) or to start a print process for the intended content. The two buttons are a button "return to browser (or print standby)" 124 and a button "print start (or print start)" 125. When the print start is selected, the print control unit 17 instructs the download unit 12 to download the content, and sends a print instruction signal to the print unit 13 together with the print settings.

Figure 7:
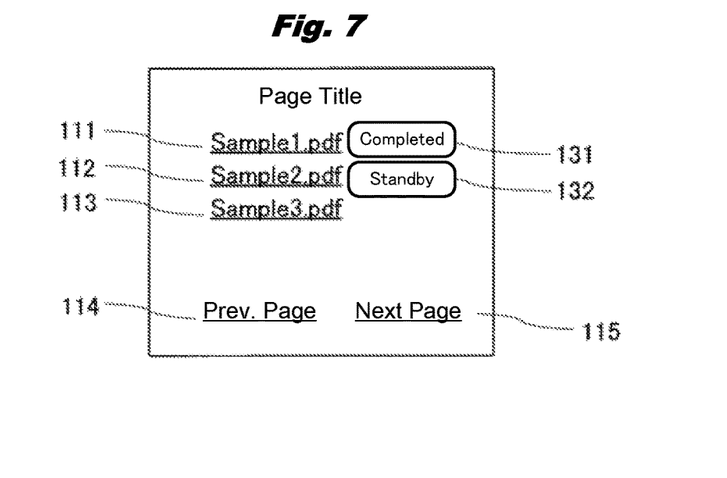
FIG. 7 is a diagram showing an example of a link destination information (hyper link) screen displayed on the operation panel by a built-in browser unit of the printing apparatus according to the present embodiment.

FIG. 7 is a diagram showing an example of a link destination information (hyper link) screen displayed on the operation panel 14 by the built-in browser 16 of the print device 1 according to the present embodiment. FIG. 7 shows an example of a screen in the case where a print process is awaited and it returns to the browser screen. FIG. 7 shows an example of a screen in the case where, from the screen of FIG. 5, "Sample1.pdf" is printed and "Sample2.pdf" is made to stand by without the print process and returns to the browser screen. Next to the hyperlink indicating the printed content, there is a character "completed" (131) which is an icon enclosed by a frame line for indicating that the print process has been finished. The icon is an example of a print completion mark. Next to the hyperlink indicating the content waiting for the print process (or standby). There is another character "Standby" (132) which is an icon enclosed by a frame line for indicating that the print process is pending. The icon is an example of a print waiting mark. From these pieces of information, the user can recognize the current situation. Although not shown in FIG. 7, an icon for canceling a print process (or print job) that is waiting at the same time and an icon for eliminating information of completed print jobs (or information of print job has been completed) may be displayed. Additionally, the built-in browser unit 16 may have a function to delete the icon for completed print job in correspondence with an operation of the user operation unit 14b. In addition, the built-in browser unit 16 may have a function to cancel a print process of the content indicated by the link destination information to which the print waiting indication was added in correspondence with an operation of the user operation unit 14b.

FIG. 8 is a diagram showing an example of the content information 141 stored in the content information storage unit 15 of the print device 1 according to the present embodiment. The content information storage unit 15 is a storage device such as a hard disk or a Random Access Memory (RAM). Upon returning to the browser screen while pending the print process of the designated content, the print control unit 17 stores the content Uniform Resource Locator (URL) and the print setting in association with each other in the content information storage unit 15.

In the present embodiment, the content information 141 is configured with, for example, a content URL (character string), a color mode ("0" or "1" as an integer indicating color printing or monochromatic printing), a tray 0", "1", "2" as integers shown), and double side printing ("0" or "1"

as an integer indicating ON or OFF of double side printing). Every time when an instruction of print standby is instructed, one item is added to the content information. The content information is deleted when the print process for the content is completed.

The print unit 13 is, for example, an image forming unit for forming an image by an electrophotographic method. Based on an instruction from the print control unit 17, the print unit 13 executes to print the content that the download unit 12 downloads in accordance with print settings.

Figure 9:
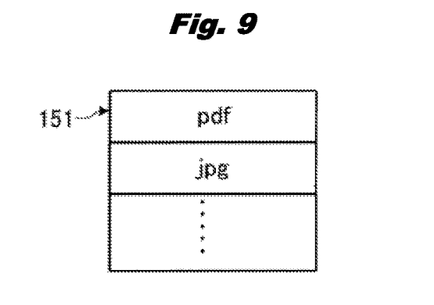
FIG. 9 is a diagram showing an example of content type stored in the content type storage unit of the printing apparatus according to the present embodiment.

FIG. 9 is a diagram showing an example of content types 151 stored in the content type storage unit 18. The content type storage unit 18 is a storage device such as a hard disk or a RAM, and stores types of content that are printable (that is, the types of content to be printed by the print unit 13). The content type is, for example, a character string, and in the example of FIG. 9, the extensions of the content are registered. Note that it is also possible to determine whether or not the content is a printable content by confirming the identifier (for example, pdf, jpg, etc.) of the content data file by the user. In this case, there is no need to be equipped with the content type storage unit 18. Further, the content type storage unit 18 and the content information storage unit 15 may be stored in different storage areas of the same storage device.

<<2>> Operation(s)

Figure 10:
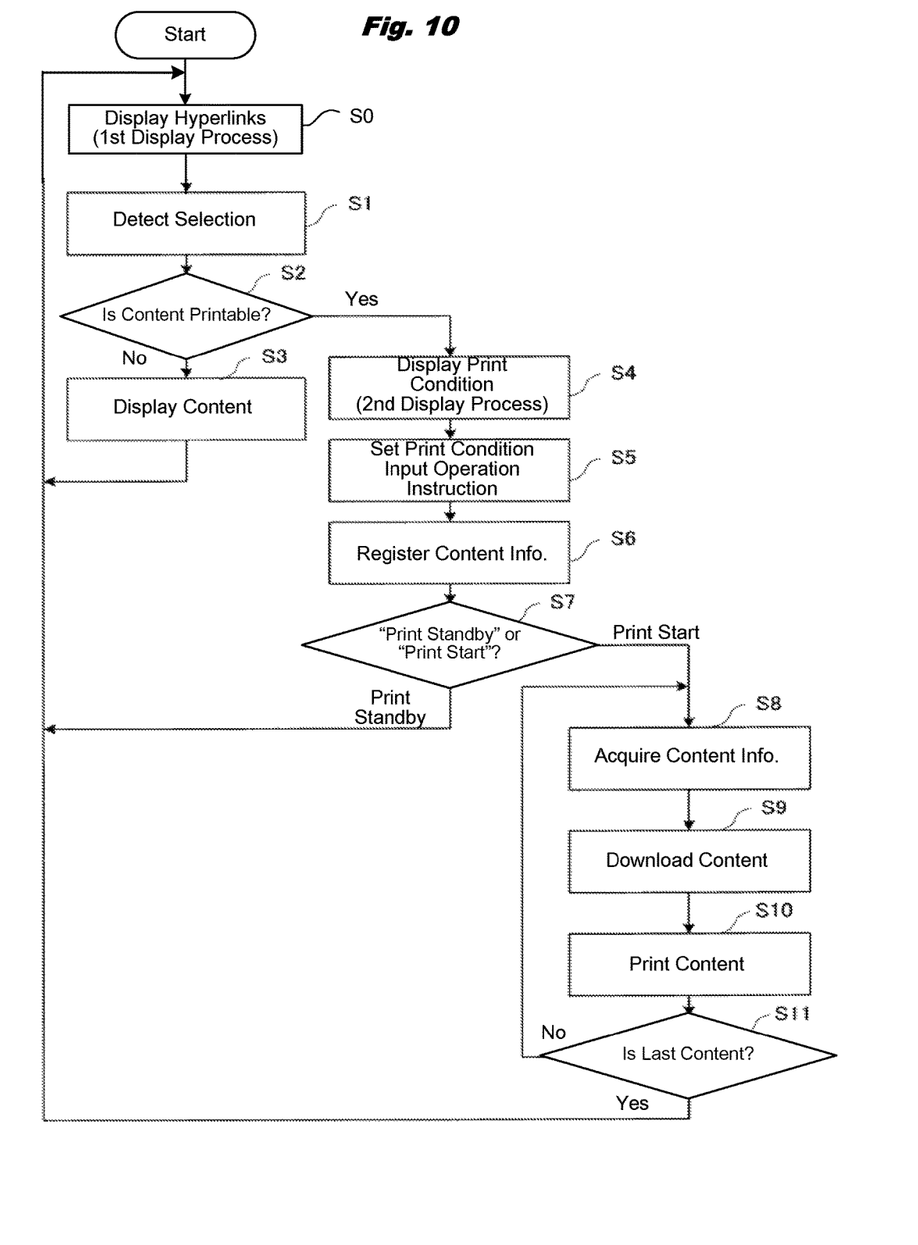
FIG. 10 is a flowchart showing the operations of the printing apparatus according to the present embodiment.

FIG. 10 is a flowchart showing operations (or processes) of the print device 1 according to the present embodiment. FIG. 10 shows a state in which the built-in browser 16 displays a screen displaying one or more hyperlinks as shown in FIG. 5 (or a state after "first display process"), and the user selects one or more the hyperlinks by touching them. First, the control unit displays a plurality of hyperlinks (or link items) (S0 or first display process).

In this embodiment, the control unit 19 detects that a hyperlink of "Sample1.pdf," which is shown in FIG. 5, of the built-in browser unit 16 is touched and acknowledges the selected hyperlink (detect hyperlink selection at S1).

Next, the control unit 19 determines whether or not a content type of the content that is destined with the selected hyperlink (S2). In this determination, the control unit 19 refers to the content type information indicating the content type of print target stored in the content type storage unit 18.

When the control unit 19 determines that the content associated with the selected hyperlink is not printable (NO at S2), the control unit 19 displays the content, which was determined to be not printable, on the screen of the display unit 14a of the operation panel 14 (S3), and the process returns to step S0.

When the control unit 19 determines that the content associated with the selected hyperlink is printable (YES at S2), the control unit 19 displays a print setting screen on the operation panel 14 (S4, or second display process). As shown in FIG. 6, there is a print setting screen (direct print screen) in which several print setting items regarding print process conditions are listed. Further, in the embodiment, operation instruction items regarding that the user intends to start a print process or to make the print process stand by are displayed, see reference numerals 125 and 124 in FIG. 6. Reference 124 is "Returns to Browser (print standby)" and reference 125 is "Start Print (print start).

Next, the control unit 19 acquires instructions with respect to the print setting and the operation instruction made by the user (at S5). Next, content information in which the URL of the content and the print setting set by the user are associated is stored (registered) in the content information storage unit 15 (at S6, or "registration process").

Next, the control unit 19 determines that the operation instruction input at S5 is either the print start or the print standby (at S7). The print standby may be termed as a shift instruction. The print start may be termed as a print instruction.

When the operation instruction is the print standby, the process returns to step 0 (S0), and displays the hyperlinks so that another input by the user is waited. The routine from S0 though S7 continues until the other operation instruction, "print start," is selected. Every time when the print standby is selected at S5, a piece of content information is added to the content information storage unit 15 so that several pieces of the content information are to be stored at the time of print process (at S10).

When the operation instruction input by the user is to start a print process (print start at S7), the control unit 19 acquires content information, which is associated with the first selected print item, from the content information storage unit 15 (S8). At this time, the control unit 19 deletes the content information stored in the content information storage unit 15.

Next, the control unit 19 downloads the content by the download unit 12 based on the acquired content information (at S9), and causes the print unit 13 to print the downloaded content (at S10).

Next, the control unit 19 determines whether or not the printed content is for the last target to be printed (at S11). It is noted that the user may be able to select to download contents but not to print these contents immediately. These contents are expected to be printed by another operation.

When determining that the printed content is not the last target (NO at S11), the control unit 19 returns the process to step S8 and repeats the process from step S8 to step S11. The print operations from step S8 to step S10 are sequentially performed on one or more pieces of content information in the content information storage unit 15. Namely, when three print date to be printed as print targets are there, the print operations from S8 to S10 repeats three times.

When the print content is determined to be for the last print target in the content information storage unit 15 (YES at S11), the control unit 19 returns the process to step S0 so that another input from the user is waiting.

<<3>> Advantages

In the print device 1 and the printing method according to the present embodiment, when a plurality of contents are printed by browser direct printing by the built-in browser 16a, the following process are performed:
(1) "first display process" for displaying link destination information,
(2) "selection operation" for selecting the link destination information by the user,
(3) "second display process" for displaying setting items of print conditions, and
(4) "Setting Operation" by which print conditions are set by the user, the print conditions being displayed through the second display process.
(5) then, "return to the first display process when a print target remains" in order to repeat these processes (repeat as many times as the number of contents).

After these processes, by instructing the print start, images of a plurality of contents are continuously downloaded and these downloaded contents are sequentially printed. In this way, after having performed the "selection operations" and the "setting operations" for all of the contents to be printed, the "download process" and "print process" are performed. Accordingly, there is no waiting period of the user between a setting operation for a first content to a selection operation for a second (the next) content. Compared with a conventional browser direct print operation in which a download process and a print process are performed during the above period, the user's work efficiency is improved and the burden on the user is greatly reduced.

<<4>> Modification(s)

In the above embodiment, the case where the present invention is applied to the print device 1 as the image forming apparatus having the print unit 13 has been exemplified, but the present invention is also applicable to a printing process apparatus having a print unit as a separate apparatus. The print processing apparatus is, for example, a personal computer, a workstation, or the like. In this case, the print processing apparatus has, in FIG. 2, a transceiver unit 11, an operation panel 14, a content information storage unit 15, and a control unit 19 connected to the print unit as an external device.

Further, the present invention can also be applied to a printing processing program executed by a printing processing apparatus such as a computer. The print processing program executes the following process. First, the following three processes are executed:

first display process in which one or more link destination information 111 to 113, which is received via the transceiver unit 11, is displayed in the display unit 14a (S0, FIG. 5), second display process in which a setting screen of print condition of the content indicated by the selected link destination information is displayed in the display unit 14a when one of the link destination information (FIGS. 5, 111 to 113) displayed on the display unit 14 a is selected by the user operation unit 14b, registration process in which content information (FIG. 8, 141) is stored in the content information storage unit 15 (S5, S6), the content information being configured with the selected link destination information and the print conditions that are associated with each other.

Next, when the shift instruction from the user operation unit 14b to the first display process (S0) after the registration process has been input (S7, print standby, 124 in FIG. 6), the first display process (S0), the second the display process (S4), and the registration process (S5, S6) are performed one more time so that new content are added to the content information storage unit 15. Or, after the registration process, when the instruction for the print start (or print instruction) is input from the user operation unit 14b (S6, 125 in FIG. 6), the content to be printed (or print target) indicated by the content information stored in the content information storage unit 15. Thereafter, print processes (S8 to S10) of causing the print unit 13 to print the downloaded image of the content in accordance with the associated print condition may be executed for one or more pieces of content information stored in the content information storage unit 15 (FIG. 8, 141) are successively executed by the print processing apparatus. The print processing apparatus or the print device 1 can acquire this print processing program by downloading via the network 3 or by installing from a computer-readable information recording medium storing a print processing program.

Figure 11:
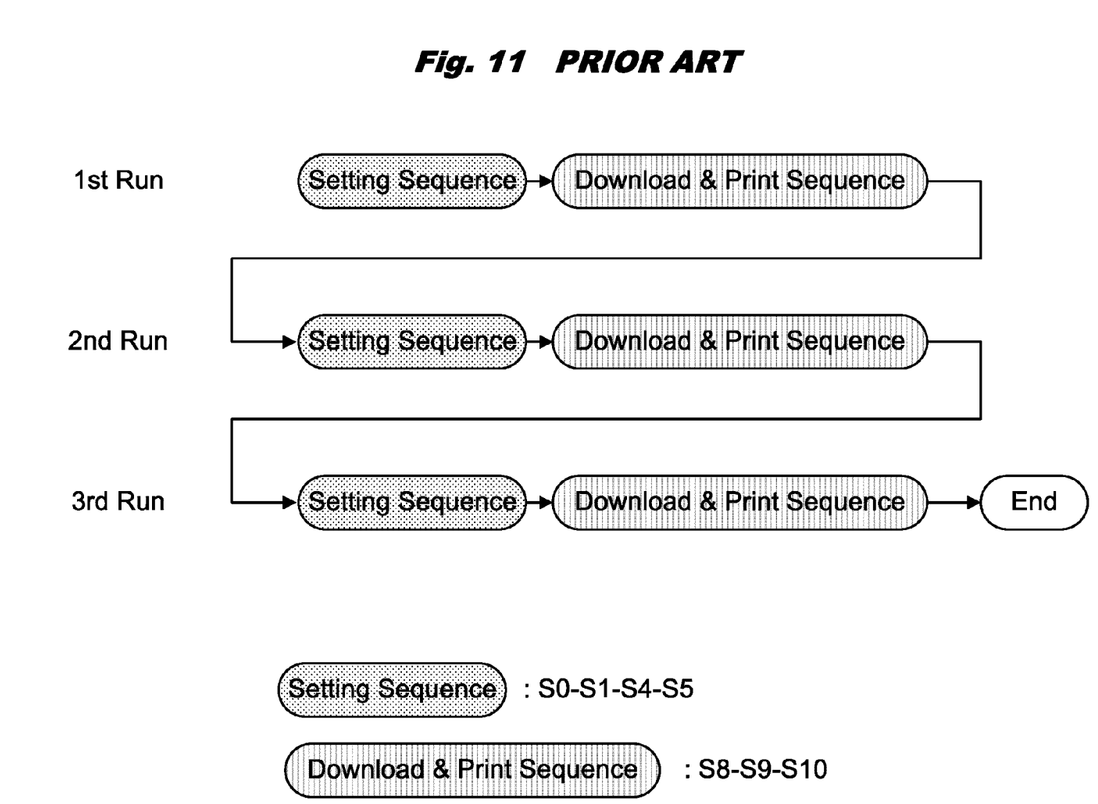
FIG. 11 shows a conventional sequence labeled as PRIOR ART.
Figure 12:
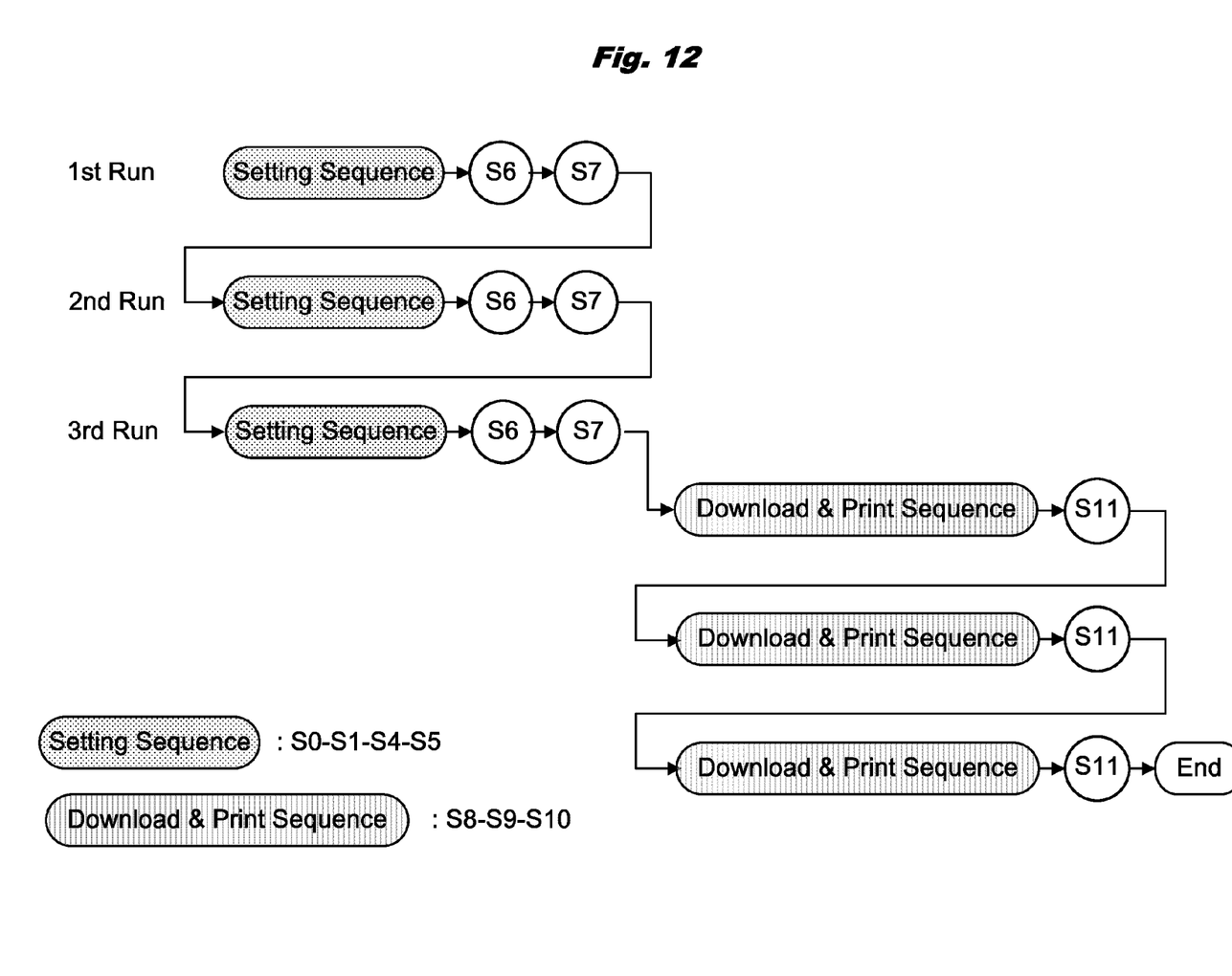
FIG. 12 shows one example of the invented sequence.

At the end, the difference between a conventional sequence and the invented sequence is briefly explained with reference to FIGS. 11 and 12. In FIG. 11, a sequence of printing three contents is illustrated. The setting sequence is composed with Step 0 to Step 4 in FIG. 10. The download and print sequence is composed with Step 8 to Step 10 in the same drawing. As illustrated, in the convention sequence, each of the download and print sequence immediately follows the setting sequence. On the other hand, in the invented sequence illustrated in FIG. 12, every time when one setting sequence is done, the content is registered at Step 6 and the user is requested to determine whether or not to proceed in the download and print sequence at Step 7. In the drawings, the user selects "Standby" in the first and second runs, then selects "Print Start" in the third run. Namely, after all of the setting sequences for three contents are complete, these download and print sequences are initiated. Also, since there is nothing to do after the third time Step 7 is done, the user no longer has to be with the apparatus after that. When the first download and print sequence is completed, it is determined by the control unit whether or not to terminate the download and print sequence. There are several factors to determine. FS One factor is whether or not a content to be printed remains. In the example in the drawing, since there are three contents downloaded and two contents among the three have not been printed, the sequences are repeated two more times. As shown in FIG. 12, by adding Steps 6, 7, and 11, the invention achieves to separately execute multiple setting sequences and multiple download and print sequences.

What is claimed is:

1. An image forming apparatus that downloads a content via a network and prints an image of the content, comprising:
 a transceiver unit that connects to the network,
 a print unit that prints the image of the content,
 a display unit that displays information,
 a user operation unit that receives a user input made by a user,
 a first storage unit, and
 a control unit that controls operations of the image forming apparatus, wherein
 the control unit executes a first display process, a second display process and a registration process,
  in the first display process, one or more link destination information, which is received through the transceiver unit, is displayed on the display unit wherein the link destination information is an address in the network by which the control unit is able to locate where an intended information exist in the network and to obtain the intended information,
  in the second display process that is executed when one of the link destination information is selected with the user operation unit, a setting screen of a print condition of content that is associated with the selected link destination information is displayed on the display unit, and
  in the registration process, content information in which the selected link destination information, the print condition that is set on the setting screen, and the content are associated each other is stored in the first storage unit,
 when a shift instruction to shift to the first display process is input from the user operation unit after the registration process is completed, the control unit repeats the first display process, the second display process and the registration process so that another content information is newly created and stored in the first storage unit, and when a print instruction to start printing is input from the user operation unit after the registration process is completed, the control unit
downloads contents indicated with the content information stored in the first storage unit wherein these contents are defined as print target contents, and
sequentially executes print operations for the images of one or more of the print target contents with the print conditions associated with the print target contents.

2. The image forming apparatus according to claim 1, wherein
the print operations are repeated until all of the print target contents are printed.

3. The image forming apparatus according to claim 1, wherein
the control unit attaches a print completion mark to the link destination information of which the content has been printed and which is displayed on the display unit in the first display process, the print completion mark indicating that the print of the print target content has been completed.

4. The image forming apparatus according to claim 3, wherein
the control unit has a function to delete the print completion mark in correspondence with an operation of the user operation unit.

5. The image forming apparatus according to claim 1, wherein
the control unit attaches a print waiting mark to the link destination information of which the content has not been printed and which is displayed on the display unit in the first display process, the print waiting mark indicating that the print of the print target content has not been completed.

6. The image forming apparatus according to claim 5, wherein
the control unit has a function to cancel the print of the print target content to which the print waiting mark is attached in correspondence with an operation of the user operation unit.

7. The image forming apparatus according to claim 1, further comprising:
a second storage unit that stores content types indicating which types of contents are printable in the print unit, wherein
when one of the link destination information displayed on the display unit is selected in the first display process, making the one of the link destination information a selected link destination information, the control unit determines whether or not a content type of content associated with the selected link destination information is printable, and
the control unit proceeds in the second display process when the content type is printable.

8. The image forming apparatus according to claim 7, wherein
the control unit does not proceed in the second display process and displays the content associated with the selected link destination information when the content type is not printable.

9. The image forming apparatus according to claim 1, wherein
the display part and the user operation part composes an operation panel that has a display function and a receiving function to receive the user input.

10. The image forming apparatus according to claim 1, wherein
the control unit is provided with a build-in browser unit, a print control unit, and a download unit,
the build-in browser unit including a build-in browser, which is a software program,
the print control unit including a print control program executed in the print unit to control the print operations, which is a software program,
the download unit including a downloader executed in the download unit to download the content, which is a software program.

11. The image forming apparatus according to claim 10, wherein
the control unit is further configured with
a third storage unit that stores the build-in browser, the print control program and the downloader, and
an information processing unit that executes the build-in browser, the print control program and the downloader.

12. The image forming apparatus according to claim 1, wherein
the content information includes a Uniform Resource Locator (URL).

13. A print method by an image forming apparatus provided with a transceiver unit that connects to a network, a print unit that prints an image of content, a display unit that displays information, a user operation unit that receives a user input made by a user, a first storage unit that storages information, and the apparatus downloading the content via the network and printing the image of the content, the print method, comprising:
executing a first display process, a second display process and a registration process,
in the first display process, one or more link destination information, which is received through the transceiver unit, is displayed on the display unit wherein the link destination information is an address information in the network by which the control unit is able to locate where an intended information exist in the network and to obtain the intended information,
in the second display process that is executed when one of the link destination information is selected with the user operation unit, a setting screen of a print condition of content that is associated with the selected link destination information is displayed on the display unit, and
in the registration process, content information in which the selected link destination information and the print condition, which is set on the setting screen, and the content are associated each other is stored in the first storage unit, and
executing a repeating process and a download and print process, wherein
when a shift instruction to shift to the first display process is input from the user operation unit after the registration process is completed, the repeating process is executed, and in the repeating process, the first display process, the second display process and the registration process are repeated so that another content information is newly created and stored in the first storage unit, and
when a print instruction to start printing is input from the user operation unit after the registration process is completed, the download and print process is executed, and in the download and print process, contents indicated with the content information stored in the first storage unit are downloaded wherein these contents are defined as print target contents, and print operations for the images of one or more of the print target contents with the print conditions associated with the print target contents are executed.

14. A print process apparatus that downloads a content via a network and prints an image of the content, comprising:
a transceiver unit that connects to the network,
a display unit that displays information,
a user operation unit that receives a user input made by a user,
a first storage unit, and
a control unit that controls operations of the image forming apparatus, wherein
the control unit executes a first display process, a second display process and a registration process,
in the first display process, one or more link destination information, which is received through the transceiver unit, is displayed on the display unit wherein the link destination information is an address information in the network by which the control unit is able to locate where an intended information exist in the network and to obtain the intended information,
in the second display process that is executed when one of the link destination information is selected with the user operation unit, a setting screen of a print condition of content that is associated with the selected link destination information is displayed on the display unit, and
in the registration process, content information in which the selected link destination information and the print condition, which is set on the setting screen, and the content are associated each other is stored in the first storage unit,
when a shift instruction to shift to the first display process is input from the user operation unit after the registration process is completed, the control unit repeats the first display process, the second display process and the registration process so that another content information is newly created, and
when a print instruction to start printing is input from the user operation unit after the registration process is completed, the control unit
downloads contents indicated with the content information stored in the first storage unit wherein these contents are defined as print target contents, and
sequentially executes print operations for the images of one or more of the print target contents with the print conditions associated with the print target contents.

\* \* \* \* \*